United States Patent [19]
Ohloff et al.

[11] 3,723,478
[45] Mar. 27, 1973

[54] MONOEPOXIDIZED PRODUCTS OF DODECATRIENE

[75] Inventors: Günther Ohloff; Karl Heinrich Schulte Elte, both of Geneva, Switzerland

[73] Assignee: Firmenich & Cie, Geneva, Switzerland

[22] Filed: May 10, 1966

[21] Appl. No.: 549,172

[30] Foreign Application Priority Data

May 11, 1965 Switzerland..........................6538/65

[52] U.S. Cl..............260/348 C, 260/343, 260/587, 260/631.5, 260/675.5, 252/522
[51] Int. Cl. ..............................C07d 1/00, C07d 1/06
[58] Field of Search ...............260/343, 586 A, 348 C

[56] References Cited

UNITED STATES PATENTS

| | | | |
|---|---|---|---|
| 1,673,093 | 6/1928 | Ruzicka | 260/586 |
| 1,702,842 | 2/1929 | Ruzicka | 260/586 |
| 2,202,437 | 5/1940 | Stoll | 260/344 |
| 2,234,551 | 3/1941 | Collaud | 260/344 |
| 2,656,390 | 10/1953 | Stoll | 260/586 |
| 3,235,601 | 2/1966 | Parsons et al. | 260/586 |
| 2,656,391 | 10/1953 | Stall | 260/586 |

*Primary Examiner*—John D. Randolph
*Assistant Examiner*—Celilia M. S. Jaisle
*Attorney*—Wenderoth, Lind & Ponack

[57] ABSTRACT

Mixtures of isomeric monoepoxides of trimethylcyclododecatrienes prepared by monoepoxidizing a mixture of 3,4,8- and 4,8,12-trimethyl-1,5,9-cyclododecatrienes or a mixture of 1,5,9- and 2,5,9-trimethyl-1,5,9-cyclododecatrienes possess valuable odoriferous properties and also have a fixative effect in mixtures with other odoriferous substances. Certain ketones and lactones derivable from the monoepoxides are also described; these also have useful odoriferous characteristics.

3 Claims, No Drawings

MONOEPOXIDIZED PRODUCTS OF DODECATRIENE

The present invention relates to new oxygenated derivatives of trimethylcyclododecatrienes and to methods for the preparation thereof. More particularly, the invention relates to new fragrant mixtures of compounds comprising a plurality of isomeric oxygenated derivatives of trimethylcyclododecatrienes.

We have found that mixtures of monoepoxides having the formulas:

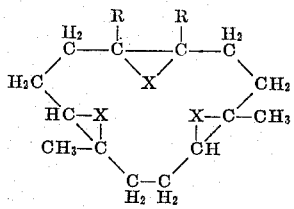

Ia and

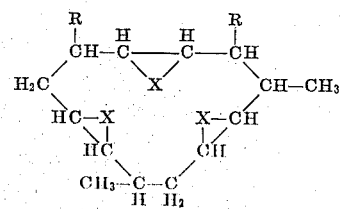

Ib wherein one of the symbols R represents methyl and the other one stands for hydrogen, and wherein one of the symbols X represents oxygen and the other two each stand for a π bond, as well as mixtures of saturated ketones, unsaturated ketones and lactones derived from the said monoepoxides possess valuable odoriferous properties and also have a fixative effect in mixtures with other odoriferous substances.

The first class of fragrant products according to the invention comprises mixtures of isomeric monoepoxides of trimethylcyclododecatrienes represented by formulas Ia and Ib. According to the invention, these mixtures of compounds are prepared by monoepoxidizing hydrocarbons having the general formulas

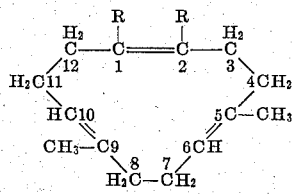

IIa and

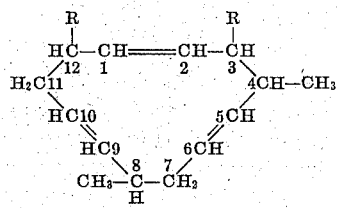

IIb wherein one of the symbols R represents methyl and the other one stands for hydrogen.

The hydrocarbons IIa and IIb used as starting materials can be prepared according to known methods [cf. for instance G. WILKE, Angew. Chem. 75, 10 (1963)] by trimerizing isoprene and piperylene, respectively, in the presence of organometallic mixed catalysts obtained by reacting aluminum alkyls or alkyl aluminum hydrides with compounds of the transition metals, such as titanium tetrachloride or chromyl chloride. The trimerization of isoprene yields hydrocarbon IIa in the form of a mixture of several position isomers and of double bond (cis-trans) isomers. Similarly, the trimerization of piperylene results in the formation of hydrocarbon IIb as a mixture of several position isomers and double bond (cis-trans) isomers. The composition of the mixtures of isomers varies somewhat, but within narrow limits, according to the type of catalyst used and the reaction conditions of the trimerization. The three double bonds of the cyclic trienes may have e.g. all-trans or trans, trans,cis-configuration. It is difficult and uneconomic to separate the individual components from the mixtures of isomeric hydrocarbons. Therefore, the mixtures are used as such for the epoxidation.

The epoxidation of the cyclic trienes IIa and IIb can be carried out by means of peracids, e.g. perbenzoic acid or monoperphthalic acid in chloroform or benzene, or peracetic acid in methylene chloride, in accordance with the conventional methods described in the literature. The reaction is carried out conveniently with about equimolecular amounts by weight of the cyclic triene and the peracid. The di-epoxides formed in small amounts in addition to the monoepoxides can be easily removed by distillation. According to the composition of the starting hydrocarbons the monoepoxides resulting from the epoxidation are also mixtures of isomers. From the hydrocarbons IIa there is obtained a mixture of monoepoxides which comprises the four theoretically possible position isomers, viz. the 1,5,9-, 2,5,9-, 2,5,10- and 2,6,9-trimethyl-5,9-cyclododecadien-1,2-epoxides, as was shown by gas chromatography. From the hydrocarbons IIb there is obtained a mixture of monoepoxides which also includes the four theoretically possible position isomers, viz. the 4,8,12-, 3,4,8-, 3,4,12- and 3,7,8-trimethyl-5,9-cyclododecadien-1,2-epoxides. In both the isoprene series and the piperylene series the position isomers of the monoepoxides exist in the form of several double bond isomers (cis-trans isomerism) and stereoisomers. These two types of isomerism are not taken into account in the structural formulas represented in the present specification.

A further class of compounds according to this invention includes unsaturated ketones derived from the monoepoxides described above. According to the invention the unsaturated ketones are prepared by isomerizing the monoepoxide mixtures Ia and Ib, respectively, by means of acids. The isomerization can be carried out e.g. by means of mineral acids, such as perchloric acid, or Lewis' acids, such as boron trifluoride etherate. The reaction is conveniently carried out in an inert organic solvent, such as dioxan. The isomerization proceeds according to the following reaction scheme (the structural formulas represented hereinafter are simplified inasmuch as the carbon atoms are represented by dots and the methyl groups by short lines):

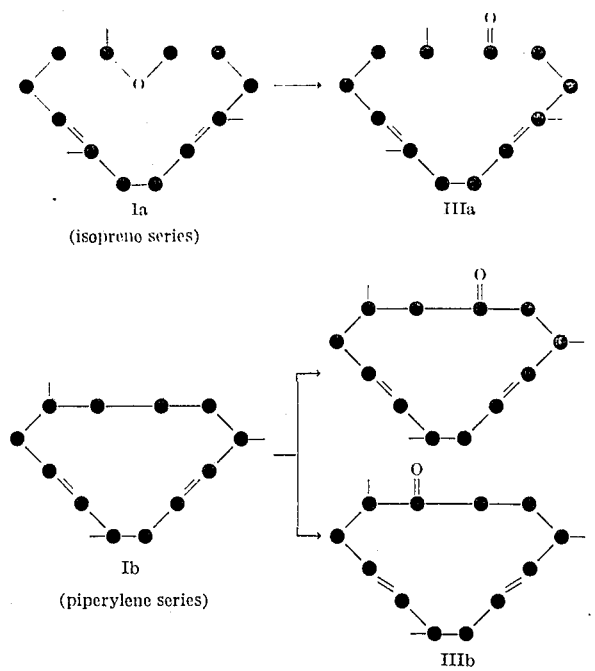

Ia (isoprene series) → IIIa

Ib (piperylene series) → IIIb

This reaction scheme represents the isomerization of one position isomer only of each the isoprene and the piperylene series. Actually mixtures of position isomers of the unsaturated ketones IIIa and IIIb are obtained since mixtures of position isomers of the monoepoxides are used as starting materials. In addition, double bond (cis,trans) isomers and stereoisomers are formed which are not shown in the formulas. The isomerization of the monoepoxides results in the formation of the following theoretically possible position isomers of the unsaturated ketones: Isoprene series: 4,8,12-, 4,9,12-, 5,8,12- and 5,9,12-trimethyl-4,8-cyclododecadien-1-ones.
Piperylene series: 2,3,7-, 2,3,10-, 2,6,7-, 2,6,10-, 3,7,11-, 3,10,11-, 6,7,11- and 6,10,11-trimethyl-4,8-cyclododecadien-1-ones.

A further class of compounds according to this invention includes saturated ketones derived from the monoepoxides described above. According to the invention the saturated ketones are prepared by hydrogenating the monoepoxide mixtures Ia and Ib, respectively, and oxidizing the resulting mixtures of position-isomeric secondary alcohols. The hydrogenation can be carried out by known methods, e.g. by using Raney nickel as a catalyst at elevated pressures and temperatures. As an example, pressures of about 120 atmospheres and temperatures of about 200° C. can be used. Suitable solvents for the hydrogenation include e.g. alcohols, such as methanol and ethanol. The secondary alcohols can be oxidized e.g. by means of chromic acid. The oxidation reaction is conveniently carried out according to the method described in Helv. Chim. Acta 32, 1354 (1949) in the presence of acetic acid and benzene. The formation of the saturated ketones from the monoepoxides can be represented by the following reaction scheme:

This reaction scheme illustrates the formation of one position isomer only of each the isoprene and the piperylene series. Actually mixtures of a plurality of position-isomeric saturated ketones Va and Vb are obtained since mixtures of position-isomeric monoepoxides are used as the starting materials. Furthermore, the position-isomeric saturated ketones can exist in the form of a plurality of stereoisomers which are not shown in the formulas. The following theoretically possible position-isomeric saturated ketones are obtained as evidenced by gas-chromatography:
Isoprene series: 2,5,9-, 2,5,10-, 2,6,9- and 2,6,10-trimethyl-cyclododecan-1-ones;
Piperylene series: 2,3,7-, 2,3,10-, 2,6,7-, 2,6,10-, 3,4,8-, 3,4,11-, 3,7,8- and 3,7,11-trimethyl-cyclododecan-1-ones.

The saturated ketones Va and Vb can also be prepared according to this invention by catalytically hydrogenating the unsaturated ketones IIIa and IIIb. The hydrogenation can be carried out at normal or elevated pressure using Raney nickel or a noble metal catalyst in an alcohol, such as methanol or ethanol.

A further class of compounds according to this invention includes lactones derived from the saturated ketones Va and Vb. According to the invention the lactones are prepared by oxidizing the mixtures of saturated ketones Va and Vb, respectively, according to the method of Bayer-Villiger. Inorganic or organic peracids, e.g. persulfuric acid or peracetic acid, can be

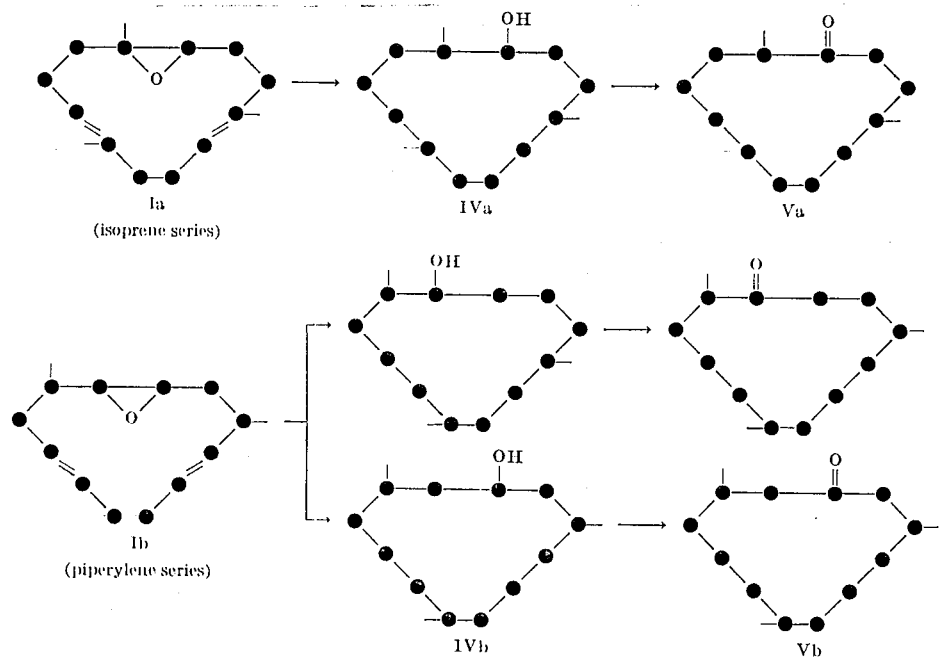

Ia (isoprene series) → IVa → Va

Ib (piperylene series) → IVb → Vb used as the oxidizing agent. The oxidation reaction is conveniently carried out at temperatures around 0° C. The preparation of the lactones can be illustrated by the following reaction scheme:

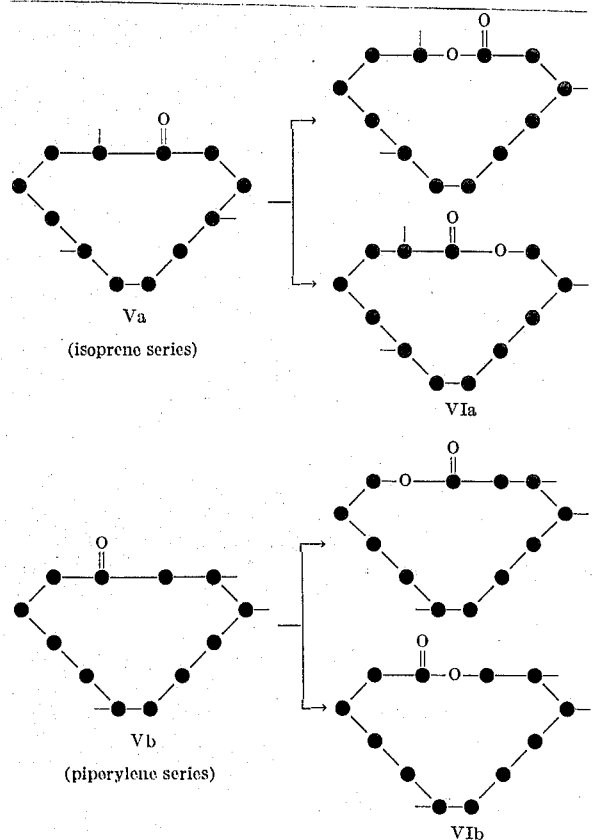

This reaction scheme illustrates the formation of one position isomer only of each of the isoprene and the piperylene series. Actually mixtures of position-isomeric lactones are obtained since mixtures of position-isomeric saturated ketones are used as the starting materials. The following theoretically possible position-isomeric lactones are obtained as shown by gaschromatography:

Isoprene series: 2,5,9-, 2,5,10-, 2,6,9-, 2,6,10-, 4,8,12-, 4,9,12-, 5,8,12- and 5,9,12-trimethyl-1,12-dodecanolides.

Piperylene series: 2,3,7-, 2,3,10-, 2,6,7-, 2,6,10-, 3,4,8-, 3,4,11-, 3,7,8-, 3,7,11-, 3,10,11-, 4,8,12-, 4,11,12-, 6,7,11-, 6,10,11-, 7,8,12- and 7,11,12-trimethyl-1,12-dodecanolides.

All the monoepoxides, saturated ketones, unsaturated ketones and lactones prepared according to the present invention are mixtures of a plurality of isomeric components as shown by gas-chromatography. The existence of a plurality of compounds is due, on the one hand, to position isomerism and, on the other hand, in certain cases to double bond (cis,trans) isomerism and stereoisomerism. Except for some main components, it is difficult to separate all of the numerous components from their mixtures. Therefore, we have not attempted to determine the percentages of the individual components in the mixtures. This, however, is not essential since the mixtures as such are valuable odoriferous product which can be used directly without preliminary separation in the perfume industry.

The mixtures of monoepoxides, saturated ketones, unsaturated ketones and lactones develop interesting powerful woody odors with some variations in fragrance notes according to the varying composition of the isomer mixtures. The new odoriferous substances confer an attractive warm woody note to perfume compositions of various odor types. They can be used together with other odoriferous compounds in the preparation of perfumes, or alone for perfuming soaps, wash powders and other products which normally are perfumed.

The invention is further illustrated by the following Examples without being limited thereto.

EXAMPLE 1

A reaction flask was charged with 1 liter of methylene chloride, 40 g. of anhydrous sodium acetate and 100 g. of a mixture of 3,4,8- and 4,8,12-trimethyl-1,5,9-cyclododecatrienes (piperylene series). To this mixture there were added, while stirring and cooling of the flask in an ice-bath, 93 g. of 40 percent peracetic acid. The rate of addition was adjusted in such a manner that the temperature of the reaction solution remained between 20° and 25° C. After the addition of peracetic acid was completed, viz. after about 2 hours, the reaction mixture was further stirred for 3 hours.

The reaction mixture was filtered to remove the sodium acetate, whereupon the filtrate was washed with water, then with 5 percent sodium carbonate solution and again with water. The organic phase was dried over potassium carbonate, and the solvent was distilled off in the vacuum of a water jet pump. By fractional distillation of the residue in a Vigreux column of 80 cm. length in a vacuum of 0.1 mm. Hg there were obtained 63 g. of pure monoepoxide (66.3 percent of theory, based on converted cyclic triene) in the form of a mixture of isomers having the following physical properties:

b.p. = 94°–95.5° C./0.1 mm. Hg; $n_D^{20}$ = 1.4896; $d_4^{20}$ = 0.9321.

The starting hydrocarbon used for the preparation of this monoepoxide was obtained as follows:

A reaction flask was charged with 500 ml. of abs. benzene and 4.9 ml. of chromyl chloride ($CrO_2Cl_2$) under an atmosphere of pure nitrogen. 43 ml. of diisobutyl aluminum hydride [$AlH(i-C_4H_9)_2$] were added dropwise with stirring. To the catalyst suspension were added 340 g. of piperylene purified over $Al_2O_3$, and the reaction mixture was refluxed for about 7 hours until the inside temperature had reached 81° C. The catalyst was decomposed by the addition of small portions of water, the benzene was distilled off and the residue filtered. The filtrate was fractionated in a packed column of 50 cm. length and distilled. There were thus obtained 170 g. (50 percent of the theory) of a mixture of pure 3,4,12- and 4,8,12-trimethyl-1,5,9-cyclododecatrienes.

EXAMPLE 2

A three-necked 10-liter flask equipped with a stirrer, a thermometer and a dropping funnel, was charged with 328 g. of anhydrous sodium acetate, 5 liters of methylene chloride and 816 g. of a mixture of 1,5,9- and 2,5,9-trimethyl-1,5,9-cyclododecatrienes (isoprene series), and 760 g. of 40 percent peracetic acid were added dropwise while stirring. The reaction flask was cooled in an ice-bath, and the dropping rate was adjusted in such a manner that the temperature of the reaction solution remained within 20°–25° C. When the addition of peracetic acid was completed (after about 2 hours), the reaction solution was stirred for a further 3 hours.

The reaction mixture was filtered to remove the sodium acetate and the filtrate was washed with water, then with 5 percent sodium carbonate solution and again with water. The organic phase was dried over potassium carbonate and the solvent was evaporated in the vacuum of a water jet pump. By fractional distillation of the residue in a Vigreux column of 80 cm. length 510 g. of pure monoepoxide (62.5 percent of the theory, based on the converted cyclic hydrocarbon) were obtained in the form of a mixture of isomers having the following physical properties: b.p. = 105°–107° C./0.2 mm. Hg.; $n_D^{20}$ = 1.5060; $d_4^{20}$ = 0.9634.

The cyclic hydrocarbon required for the preparation of this monoepoxide was obtained as follows:

A reaction flask was charged with 1 liter of abs. benzene and 10 ml. of chromyl chloride under an atmosphere of pure nitrogen. 90 ml. of diisobutyl aluminum hydride were slowly added dropwise while stirring. To the catalyst suspension were then added 720 g. of isoprene, and the reaction solution was refluxed with simultaneous stirring for about 70 hours until the inside temperature had reached 80° C. The catalyst was then decomposed by cautiously adding water. The precipitate was filtered off, the benzene was distilled off, and the residue was subjected to a fractional distillation in vacuo in a packed column. There was obtained, in a 16 percent yield, a mixture of pure 1,5,9- and 2,5,9-trimethyl-1,5,9-cyclododecatrienes boiling at 133°–135° C./10 mm. Hg.

EXAMPLE 3

A three-necked 1-liter flask equipped with a stirrer and a thermometer was charged with a solution of 100 g. of the monoepoxide mixture (isoprene series) prepared according to Example 2 in 300 ml. of abs. dioxan under a dry atmosphere. To this solution were added portionwise within ½ hour and with vigorous stirring 5 ml. of boron trifluoride etherate (about 48 percent) by means of a pipette. The temperature of the reaction mixtures rose from 23° to 65° C. The black solution was cooled to room temperature and stirred for a further 3 hours. The dioxan was distilled off in vacuo and the residue taken up in ether. The ethereal solution was washed with 5 percent sodium bicarbonate solution and with water and then dried over sodium sulfate. The ether was evaporated to obtain 100 g. of an odoriferous oil which was purified by chromatography on $Al_2O_3$ (activity I, neutral) using petroleum ether (boiling range: 30°–50° C.) as the eluent. The purified mixture of unsaturated ketones consisting of a plurality of position isomers (cf. general description) had the following physical properties: $d_4^{20}$ = 0.9729; $n_D^{20}$ = 1.5061.

EXAMPLE 4

100 g. of a monoepoxide mixture (piperylene series) prepared according to Example 1 was isomerized and worked up in the manner described in Example 3. The obtained mixture of isomeric unsaturated ketones had the following physical properties: $d_4^{20}$ = 0.9770; $n_D^{20}$ = 1.5055.

EXAMPLE 5

A solution of 20 g. of a mixture of monoepoxides (isoprene series) prepared according to Example 2 in 80 ml. of methanol to which 0.15 g. of Raney nickel had been added was shaken for 25 hours in a 500 ml. rocking autoclave under a hydrogen pressure of 120 atmospheres at 200° C. The catalyst was filtered off and the methanol evaporated. There were thus obtained 20 g. of crude product. The latter was purified by chromatography on 200 g. of $Al_2O_3$ (activity I, neutral) using petroleum ether (boiling range: 30°–50° C.) as the eluent. By a further elution with methanol there were obtained 14 g. of a mixture of pure secondary alcohols having the following physical properties: $d_4^{20}$ = 0.9335; $n_D^{20}$ = 1.4867.

A round flask equipped with a stirrer was charged with 122 ml. of water and a solution of 22.3 g. of an alcohol mixture (prepared as described above) in 15.4 ml. of acetic acid. Then 20 g. of 50 percent sulfuric acid were added within 5 minutes, and the mixture was stirred for 10 minutes. Then 16 ml. of benzene and 19 g. of 50 percent aqueous sodium dichromate solution were added, and the mixture was stirred for 15 minutes. There were again added 12 g. of 50 percent aqueous sodium dichromate solution, and stirring was continued for 10 minutes. 18 g. of 50 percent sulfuric acid were added within 5 minutes and 10 minutes later 15 ml. of benzene and 12 g. of 50 percent aqueous sodium dichromate solution were added. After a further 5 minutes 12 g. of 50 percent sulfuric acid were added. 10 minutes later there were finally added 18 g. of 50 percent aqueous sodium dichromate solution, whereupon the reaction mixture was further stirred for 1 hour. The organic phase was separated, washed first with 10 percent sodium carbonate solution and then with water until it was neutral and finally subjected to a steam distillation. The distillate was extracted with benzene and the benzene distilled off. 21.9 g. of a mixture of isomeric saturated ketones were obtained. The mixture of ketones was purified by chromatography on $Al_2O_3$ in the manner described in the preceding Examples. The purified ketone mixture had the following physical properties: $d_4^{20}$ = 0.9232; $n_D^{20}$ = 1.4778.

EXAMPLE 6

22.3 g. of a monoepoxide mixture (piperylene series) prepared according to Example 1 were reacted and worked up in the manner described in Example 5. The resulting mixture of isomeric ketones had the following physical properties: $d_4^{20}$ = 0.9212; $n_D^{20}$ = 1.4762.

EXAMPLE 7

A three-necked flask equipped with a stirrer and a thermometer was charged with a mixture of 175 ml. of glacial acetic acid and 100 ml. of conc. sulfuric acid. The acid mixture was cooled to 0° C., whereupon 30.9 g. of a ketone mixture (isoprene series) prepared according to Example 5 and then a mixture of 109 g. of 40 percent peracetic acid and 30 g. of acetone were added. The reaction temperature was maintained between 0° and 5° C. After the addition of the peracetic acid mixture was completed the reaction mixture was further stirred for 2 hours and then extracted with ether. The ethereal extract was washed with 5 percent aqueous sodium bicarbonate solution and then with water and dried over $Na_2SO_4$. 26.3 g. of a yellowish oil were obtained by evaporation of the ether. The oil was purified by chromatography on 300 g. of $Al_2O_3$ (activity I, neutral) using ether as the eluent. 15.8 g. of a mixture of isomeric lactones were obtained. The purified lactone mixture had the following physical properties: $d_4^{20}$ = 0.9559; $n_D^{20}$ = 1.4763.

EXAMPLE 8

30.9 g. of a ketone mixture (piperylene series) prepared according to Example 6 were reacted and worked up in the manner described in Example 7. The obtained mixture of lactones had the following physical properties: $d_4^{20} = 0.9585$; $n_D^{20} = 1.4752$.

The following Examples relate to the preparation of perfume compositions using the odoriferous products of this invention.

EXAMPLE 9

An odoriferous composition having a floral odor and comprising the components listed hereinafter was used as the base. By adding the monoepoxide mixture prepared from the cyclic hydrocarbon Ia according to Example 2 an attractive woody note was imparted to the base.

| Components | Parts by weight |
|---|---|
| undecanal * | 40 |
| dodecanal * | 20 |
| α-amyl-cinnamic aldehyde | 20 |
| hydroxycitronellal | 120 |
| methyl-ionones | 90 |
| benzyl acetate | 90 |
| phenylethyl propionate | 10 |
| phenylethyl phenylacetate | 10 |
| monoacetate of nonan-1,3-diol | 10 |
| rhodinol | 60 |
| linalool | 30 |
| phenyl ethanol | 90 |
| cinnamic alcohol | 30 |
| Bergamot oil | 90 |
| Ylang | 30 |
| Styrax (purified)** | 30 |
| benzoic tears * | 30 |
| santalol | 20 |
| abs. rose oil | 15 |
| abs. jasmin oil | 15 |
| abs. iris oil * | 20 |
| musk ketone | 50 |
| | 920 |
| Addition trimethyl-cyclododecatriene-monoepoxide (according to Example 2) | 80 |
| | 1000 |

* 10% solution in diethyl phthalate
** 50% solution in diethyl phthalate

EXAMPLE 10

An odoriferous composition having a floral chypre-like odor and comprising the components listed hereinafter was used as a base. By adding the monoepoxide mixture prepared from the cyclic hydrocarbon Ib according to Example 1 an attractive woody note was imparted to the base.

| Components | Parts by weight |
|---|---|
| undecanal* | 40 |
| methyl nonyl acetaldehyde* | 20 |
| hydroxycitronellal | 90 |
| cyclamen aldehyde* | 30 |
| methyl ionones | 90 |
| benzyl acetate | 80 |
| monoacetate of nonan-1,3-diol | 20 |
| ethyl methylphenylglycidate* | 10 |
| dimethylacetal of phenylacetaldehyde | 5 |
| phenylethanol | 90 |
| rhodinol | 90 |
| linalool | 30 |
| dihydrojasmone* | 15 |
| Bergamot oil | 90 |
| Ylang | 30 |
| Patchouli | 10 |
| vetyveryl acetate | 20 |
| musk ketone | 50 |
| coumarin | 10 |
| abs. oak moss oil** | 60 |
| abs. rose oil | 15 |
| abs. jasmin oil | 15 |
| | 910 |
| Addition trimethyl-cyclododecatriene-monoepoxide (according to Example 1) | 90 |
| | 1000 |

* 10% solution in diethyl phthalate
** 50% solution in diethyl phthalate

In the formulas of Examples 9 and 10 the monoepoxide mixtures can be replaced by the same quantity of one of the fragrant mixtures prepared according to the foregoing Examples 3 to 8. There are thus obtained essentially similar odoriferous effects differing only in secondary odor notes.

We claim:

1. A mixture of compounds having the formula

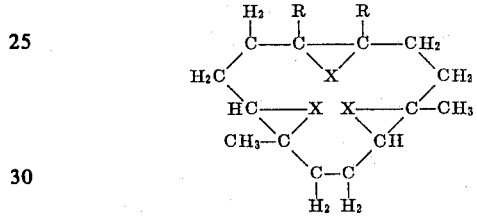

wherein one of the symbols R represents methyl and the other one stands for hydrogen, and wherein one of the symbols X represents oxygen and the other two each stand for a π-bond, the said mixture being obtained by subjecting a mixture of 1,5,9-trimethyl-1,5,9-cyclododecatriene and 2,5,9-trimethyl-1,5,9-cyclododecatriene to epoxidation by means of peracid.

2. A mixture of compounds having the formula

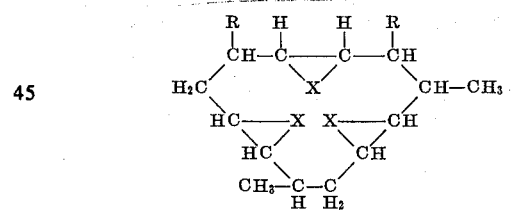

wherein one of the symbols R represents methyl and the other one stands for hydrogen, and wherein one of the symbols X represents oxygen and the other two each stand for a π-bond, the said mixture being obtained by subjecting a mixture of 3,4,8-trimethyl-1,5,9-cyclododecatriene and 4,8,12-trimethyl-1,5,9-cyclododecatriene to epoxidation by means of peracid.

3. A monoepoxidized product prepared by reacting a per acid with a material selected from the group consisting of mixtures of 2,5,9-trimethyl-cyclododecatriene-1,5, 9 and 1,5,9-trimethyl-cyclododecatriene-1,5,9.

* * * * *